United States Patent
Dry et al.

(10) Patent No.: US 10,351,022 B1
(45) Date of Patent: Jul. 16, 2019

(54) RAIL SYSTEM FOR A VEHICLE

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Brian Robert Spahn, Plymouth, MI (US); Benjamin Yilma, Canton, MI (US); S. M. Akbar Berry, Windsor (CA); Kevin Wayne Preuss, Berkley, MI (US); Marcos Silva Kondrad, Macomb Township, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 15/871,354

(22) Filed: Jan. 15, 2018

(51) Int. Cl.
| | | |
|---|---|---|
| *B60N 2/34* | (2006.01) | |
| *B60N 2/07* | (2006.01) | |
| *B60N 2/01* | (2006.01) | |
| B60N 2/02 | (2006.01) | |

(52) U.S. Cl.
CPC ............ *B60N 2/0735* (2013.01); *B60N 2/01* (2013.01); *B60N 2/34* (2013.01); *B60N 2002/0204* (2013.01)

(58) Field of Classification Search
CPC .......... B60N 2/0735; B60N 2/34; B60N 2/01; B60N 2002/0204; B60N 2/01508
USPC .................................................. 296/64, 65.01
See application file for complete search history.

(56) References Cited

U.S. PATENT DOCUMENTS

| | | | | |
|---|---|---|---|---|
| 3,065,023 A | * | 11/1962 | Spound | B60N 2/34 297/423.26 |
| 3,981,520 A | | 9/1976 | Pulling | |
| 4,508,294 A | | 4/1985 | Lorch | |
| 8,616,643 B2 | * | 12/2013 | Darbyshire | B64D 11/06 297/340 |
| 8,955,814 B2 | * | 2/2015 | Moriyama | B60N 2/0705 248/429 |
| 2013/0241258 A1 | * | 9/2013 | Wallace | A47C 17/12 297/354.13 |
| 2017/0267124 A1 | * | 9/2017 | Numazawa | B60N 2/01 |

FOREIGN PATENT DOCUMENTS

| | | |
|---|---|---|
| EP | 2510838 A1 | 10/2012 |
| WO | WO-2005035301 A2 * | 4/2005 ......... B60N 2/01508 |

* cited by examiner

*Primary Examiner* — Pinel E Romain
(74) *Attorney, Agent, or Firm* — Vichit Chea; Price Heneveld LLP

(57) ABSTRACT

A vehicle seating arrangement includes a rail system that has a plurality of lateral and longitudinal rails. The vehicle seating arrangement also includes at least one seating assembly coupled to the rail system. The seating assembly includes one or more armrests coupled to a seat-base. The armrests are configured for articulation in a vertical direction relative to the seat-base. The armrests enable the seating assembly to transition between captains' chair, loveseat, and bed configurations.

20 Claims, 12 Drawing Sheets

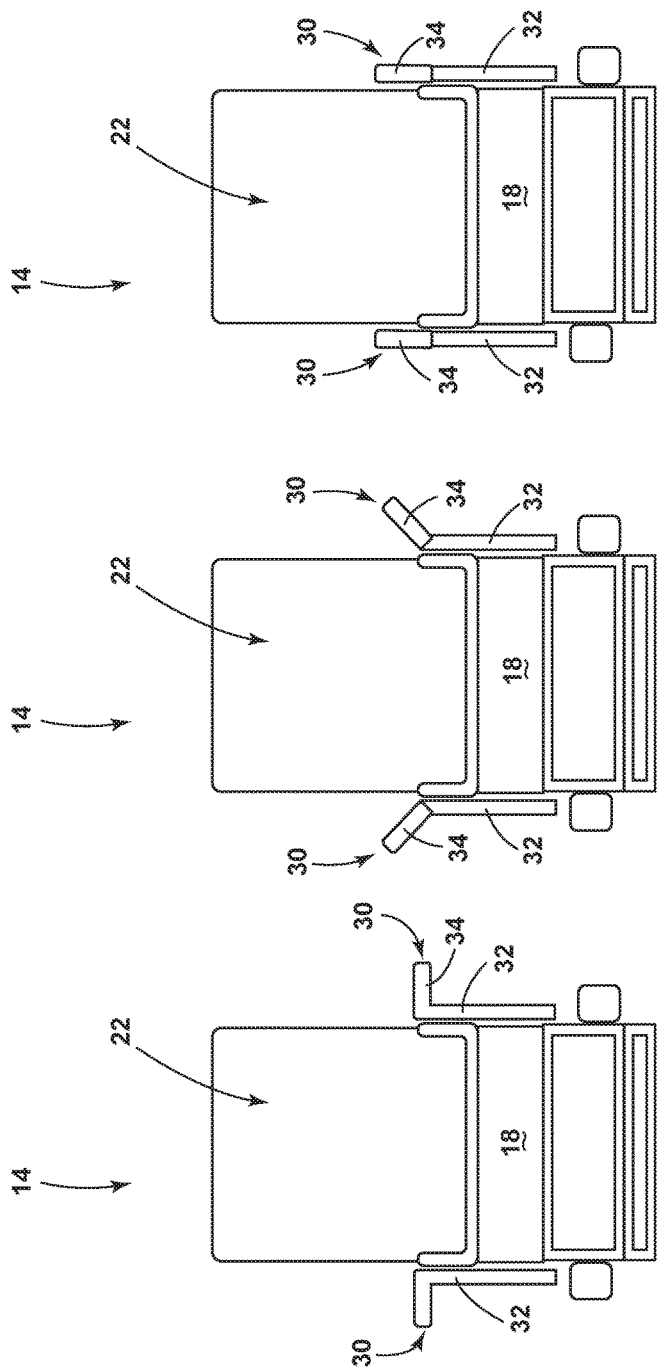

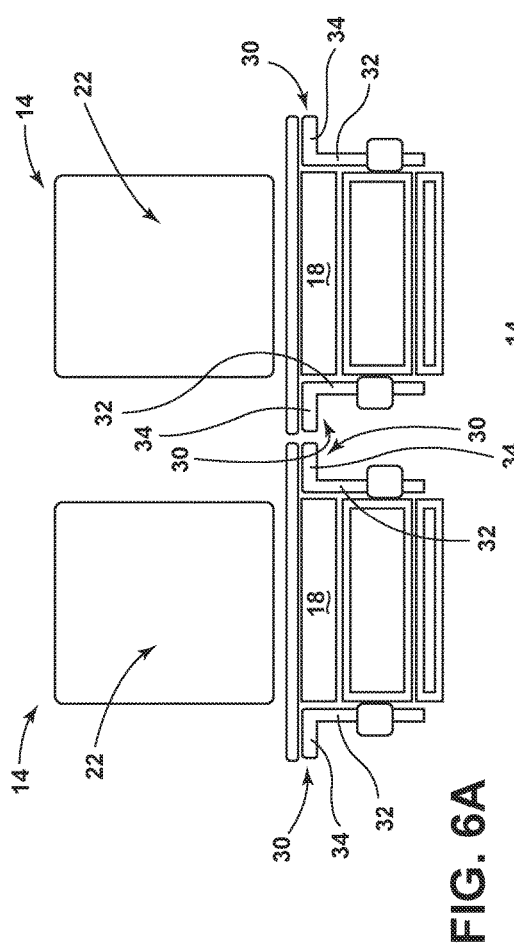
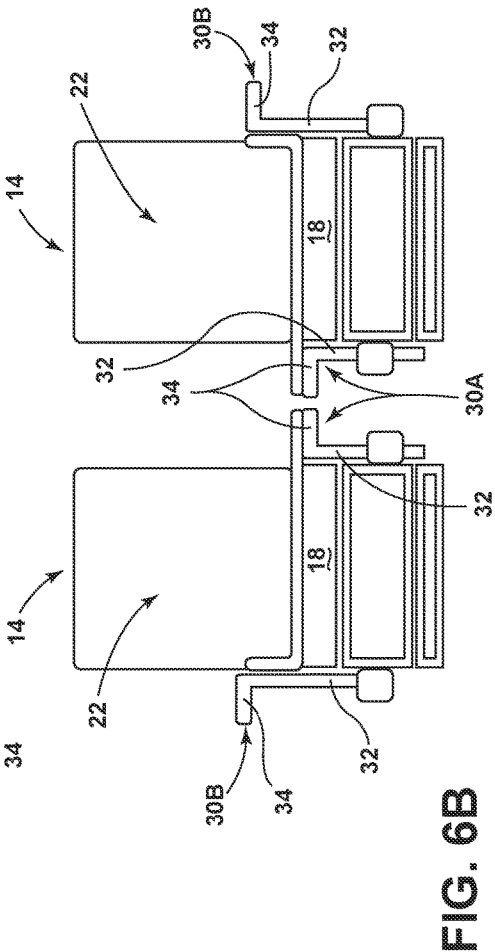

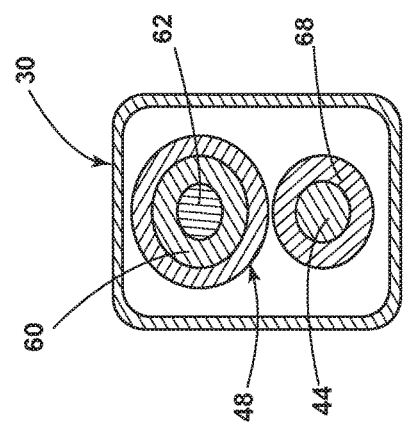
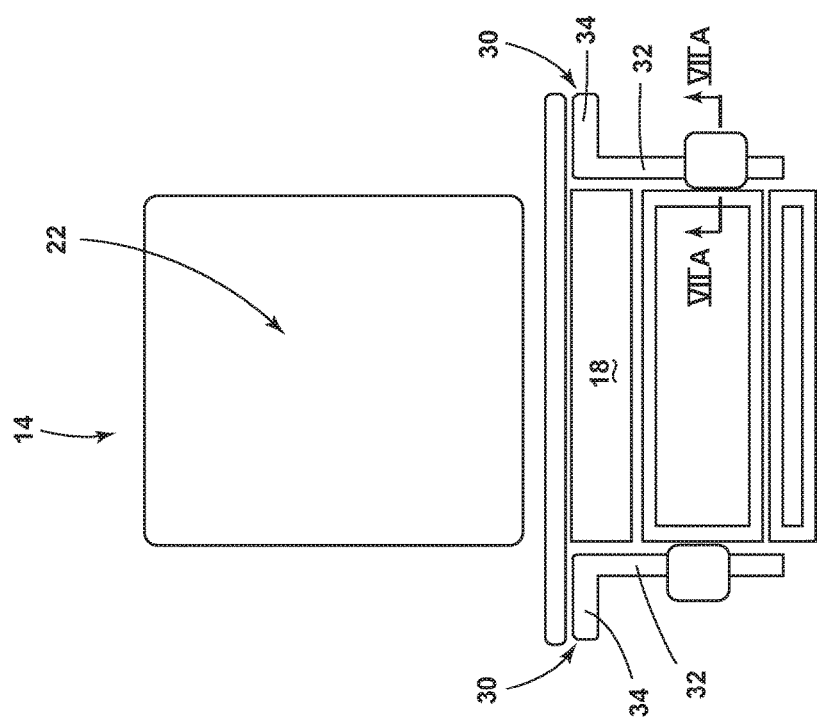
FIG. 7A
FIG. 7

RAIL SYSTEM FOR A VEHICLE

FIELD OF THE DISCLOSURE

The present disclosure generally relates to vehicles. More specifically, the present disclosure relates to rail systems for vehicles.

BACKGROUND OF THE INVENTION

Autonomous vehicles create a new expectation of occupant freedom of movement within a vehicle. This may challenge conventional wisdom for vehicle design.

SUMMARY OF THE INVENTION

According to a first aspect of the present disclosure, a vehicle seating arrangement includes a rail system that has a plurality of lateral and longitudinal rails. The vehicle seating arrangement also includes at least one seating assembly coupled to the rail system. The seating assembly includes one or more armrests coupled to a seat-base. The armrests are configured for articulation in a vertical direction relative to the seat-base. The armrests enable the seating assembly to transition between captains' chair, loveseat, and bed configurations.

Embodiments of the first aspect of the present disclosure can include any one or a combination of the following features:
  the at least one seating assembly includes a first seating assembly and a second seating assembly;
  the plurality of lateral rails includes at least five lateral rails;
  the at least five lateral rails provide three or more parallel lateral tracks;
  the plurality of longitudinal rails includes at least two longitudinal rails that extend across at least about fifty percent of a length of an interior of a vehicle to which the longitudinal rails are coupled;
  the at least two longitudinal rails are positioned on a first side of the vehicle such that a side entrance on a second side of the vehicle remains unimpeded;
  the at least two longitudinal rails are positioned along a central longitudinal axis of the vehicle; and
  the plurality of longitudinal rails extend across at least about eighty percent of the length of the interior of the vehicle.

According to a second aspect of the present disclosure, a vehicle seating arrangement includes a rail system that has a plurality of lateral and longitudinal rails positioned in a vehicle floor. The vehicle seating arrangement also includes at least one seating assembly coupled to the rail system. The seating assemblies include armrests coupled to a seat-base. The armrests are configured for articulation in a vertical direction relative to the seat-base. The armrests enable the seating assembly to transition between captains' chair, loveseat, and bed configurations.

Embodiments of the second aspect of the present disclosure can include any one or a combination of the following features:
  the at least one seating assembly includes a first seating assembly and a second seating assembly;
  the plurality of lateral rails includes at least five lateral rails;
  the at least five lateral rails provide three or more parallel lateral tracks;
  the plurality of longitudinal rails includes at least two longitudinal rails that extend across at least about fifty percent of a length of an interior of a vehicle to which the longitudinal rails are coupled;
  the at least two longitudinal rails are positioned on a first side of the vehicle such that a side entrance on a second side of the vehicle remains unimpeded;
  the at least two longitudinal rails are positioned along a central longitudinal axis of the vehicle; and
  the plurality of longitudinal rails extend across at least about eighty percent of the length of the interior of the vehicle.

According to a third aspect of the present disclosure, a vehicle seating arrangement includes a rail system that has at least five lateral and at least two longitudinal rails positioned in a vehicle floor. The vehicle seating arrangement also includes at least one seating assembly coupled to the rail system. The seating assemblies include armrests coupled to a seat-base. The armrests are configured for articulation in a vertical direction relative to the seat-base. The armrest enables the seating assembly to transition between captains' chair, loveseat, and bed configurations.

Embodiments of the third aspect of the present disclosure can include any one or a combination of the following features:
  the at least one seating assembly includes a first seating assembly and a second seating assembly, wherein the loveseat configuration is accomplished by articulation of the armrests of the first and second seating assemblies to a lowered position, and wherein the first and second seating assemblies are adjacent to one another and positioned such that the seat-bases of the first and second seating assemblies provide a substantially planar and continuous surface across a width of the first and second seating assemblies;
  the at least one seating assembly includes a first seating assembly, a second seating assembly, and a third seating assembly, wherein a bed configuration is accomplished by articulation of the armrests of the first, second, and third seating assemblies to a lowered position, wherein the first, second, and third seating assemblies are adjacent to one another such that a substantially planar and continuous surface of the seat-base is provided across a width of the first, second, and third seating assemblies; and
  the first, second, and third seating assemblies in the bed configuration provide the substantially planar and continuous surface as a resting surface having a length of at least about 200 cm.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4A is a front elevational view of the seating assembly, illustrating a bolster of the armrest in an outboard position, according to one embodiment;

FIG. 4B is a front elevational view of the seating assembly, illustrating the bolster of the armrest in a position between the outboard position and an inboard position, according to one embodiment;

FIG. 4C is a front elevational view of the seating assembly, illustrating the bolster of the armrest in the inboard position, according to one embodiment;

FIG. 6A is a front elevational view of two seating assemblies, illustrating the seating assemblies in a couch configuration, according to one embodiment;

FIG. 6B is a front elevational view of two seating assemblies, illustrating the seating assemblies in a loveseat configuration, according to one embodiment;

FIG. 7 is a front elevational view of the seating assembly, illustrating a propulsion feature and a propulsion system coupled to the seating assembly, according to one embodiment;

FIG. 7A is a cross-sectional view taken through line VIIA-VIIA of FIG. 7, illustrating the propulsion feature and the propulsion system coupled to the seating assembly, according to one embodiment;

DETAILED DESCRIPTION OF THE PREFERRED EMBODIMENTS

Figure 1:
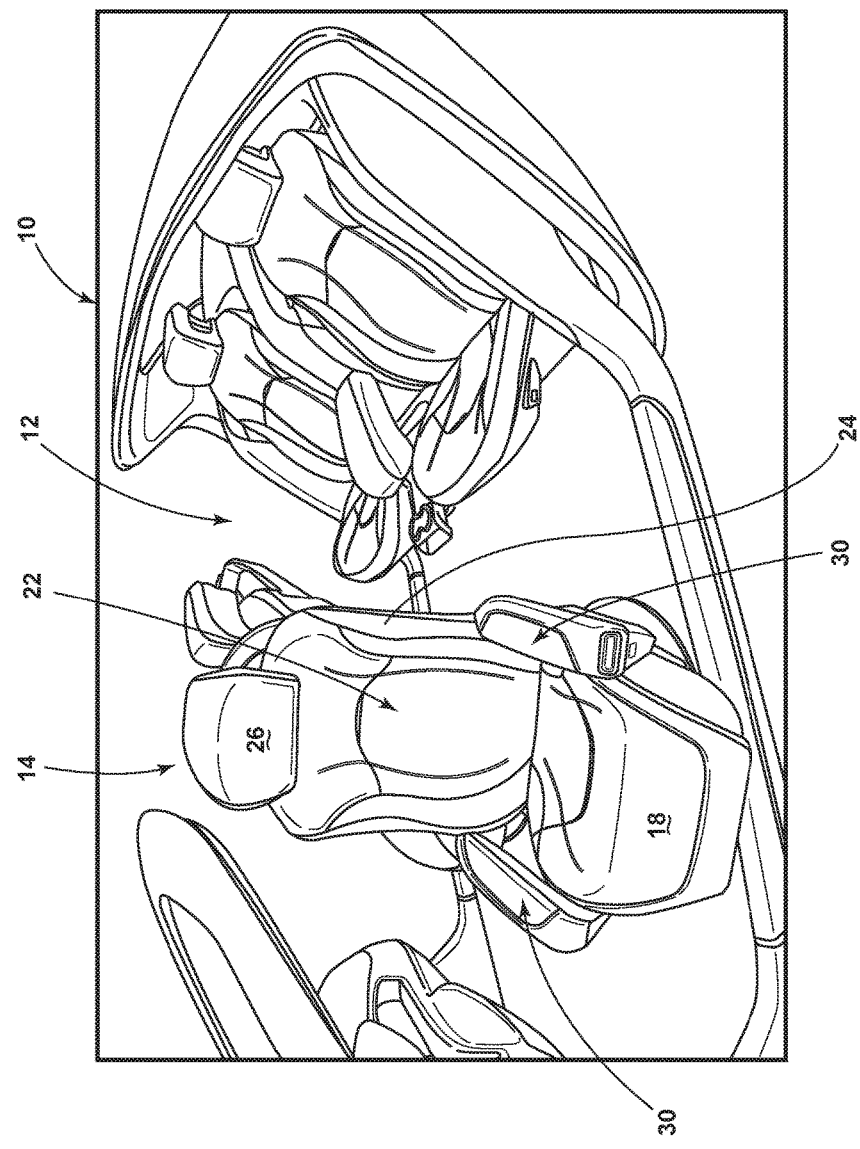
FIG. 1 is a perspective view of a vehicle interior equipped with a seating assembly having an airbag assembly in a pre-deployment position, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
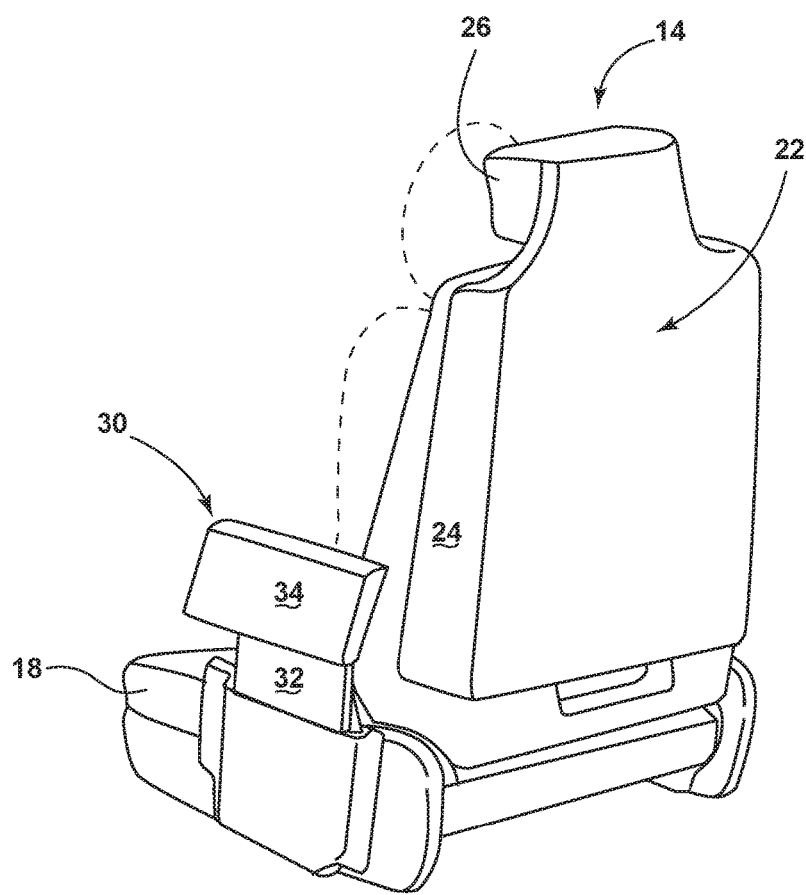
FIG. 2 is a side elevational view of the seating assembly having an armrest, according to one embodiment.

Referring to FIGS. 1 and 2, the vehicle 10 includes the seating assembly 14. The seating assembly 14 may include a seat-base 18, a seatback 22 coupled to the seat-base 18, a lateral side 24 of the seatback 22, and a headrest 26. The seating assembly 14 may be part of a vehicle seating arrangement. For example, the vehicle seating arrangement may include first, second, and/or third seating assemblies, however, the present disclosure is not so limited. In some embodiments, the seatback 22 may be pivotally coupled to the seat-base 18. The seat-base 18 may be movably coupled to the vehicle 10. For example, in some embodiments, the seat-base 18 may move along a rail system 38 coupled to the vehicle 10 (e.g., coupled to a floor of the vehicle 10). The seating assembly 14 may move in vehicle forward and rearward directions as is typical of vehicle seating assemblies. In some embodiments, the seating assembly 14 may move in various directions within the vehicle 10 and/or rotate or swivel relative to the vehicle 10 such that the seating assembly 14 may face various vehicular directions. It is contemplated that the vehicle 10 may include multiple movable seating assemblies 14 and that strategic movement of the seating assemblies 14 may provide occupants with different seating assembly configurations, such as modular couches and/or loveseats.

In some embodiments, the headrest 26 may be an extension of the seatback 22. In other words, at least a portion of the headrest 26 may be integrally coupled with at least a portion of the seatback 22. In some embodiments, the headrest 26 may be movable relative to the remainder of the seatback 22. For example, the headrest 26 may be adjusted to accommodate seating assembly occupants of differing height. In some embodiments, the lateral side 24 may generally face a direction that is generally perpendicular to the seating-assembly-forward and/or seating-assembly-rearward directions. In other words, the lateral side 24 may face seating-assembly-left or seating-assembly-right. It is contemplated that the lateral side 24 may include a plurality of lateral sides 24. For example, the seatback 22 may include a right lateral side 24 and a left lateral side 24.

Referring further to FIGS. 1 and 2, an armrest 30 may be coupled to the seating assembly 14. The armrest 30 may be coupled to the seatback 22 and/or seat-base 18. The armrest 30 may be operable between various positions. For example, in some embodiments, relative to the seating assembly 14, the armrest 30 may move, pivot, slide, and/or articulate forward, rearward, upward, downward, inboard, outboard, and/or combinations thereof.

Figure 3A:
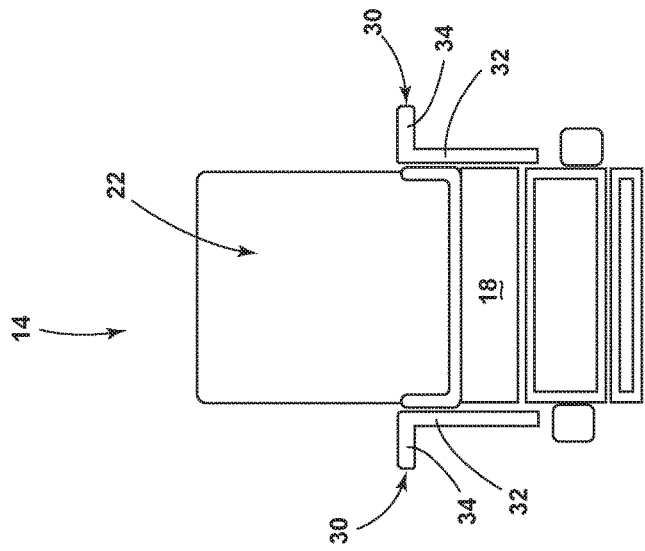
FIG. 3A is a front elevational view of the seating assembly, illustrating a support member of the armrest in a lowered position, according to one embodiment.
Figure 3B:
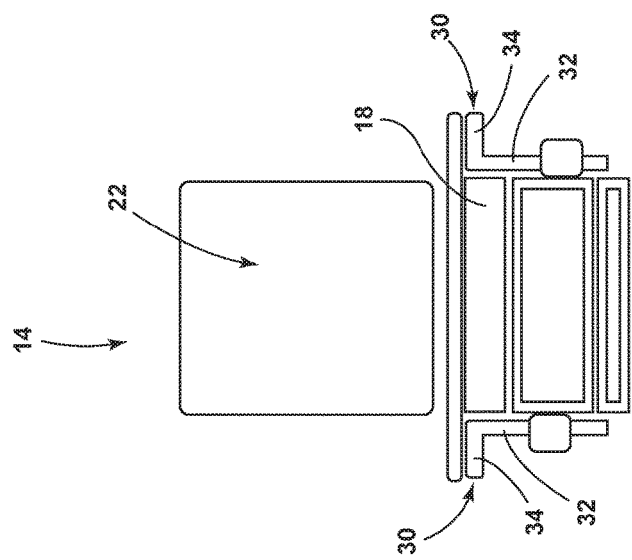
FIG. 3B is a front elevational view of the seating assembly, illustrating the support member of the armrest in a raised position, according to one embodiment.

In some embodiments, the armrest 30 may include multiple components. The components may be operable between various positions. For example, as shown in FIGS. 2-3B, the armrest 30 may include a support member 32 and a bolster 34. The support member 32 may be coupled to the seat-base 18. In some embodiments, the support member 32 may be operable to move seating-assembly-upward and seating-assembly-downward. Accordingly, the support member 32 may be operable between a lowered position and a raised position, as depicted by FIGS. 3A and 3B, respectively. It is contemplated that, in some embodiments, the support member 32 may additionally move other seating-assembly-directions relative to the seat-base 18.

Figure 5A:
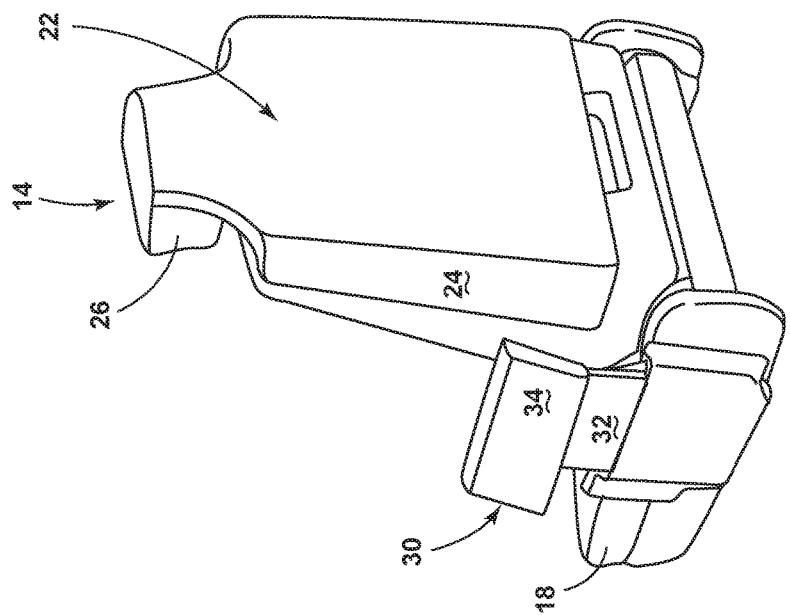
FIG. 5A is a side elevational view of the seating assembly, illustrating the bolster of the armrest in a rearward position, according to one embodiment.
Figure 5B:
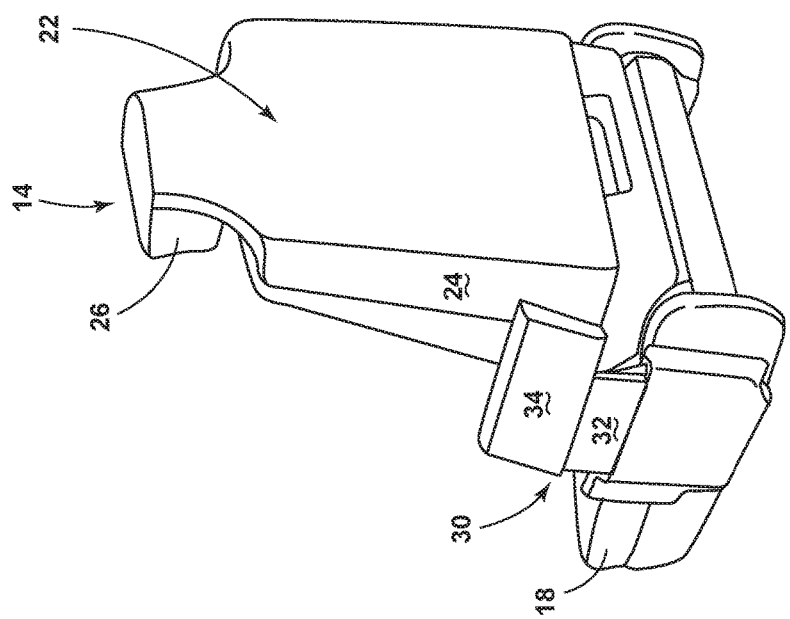
FIG. 5B is a side elevational view of the seating assembly, illustrating the bolster of the armrest in a forward position, according to one embodiment.

In various embodiments, the bolster 34 may be coupled to the support member 32. For example, the bolster 34 may be coupled to an upper end of the support member 32. The bolster 34 may extend perpendicularly from the support member 32. As shown in FIGS. 3A and 3B, the bolster 34 may move seating-assembly-upward and seating-assembly-downward with the support member 32. In some embodiments, the bolster 34 may protrude beyond the support member 32 in the seating-assembly-forward direction. In some embodiments, the bolster 34 may be movably coupled to the support member 32. For example, as shown in FIGS. 4A-4C, the bolster 34 may be capable of articulation relative to the support member 32 such that the bolster 34 may articulate in the seating-assembly-inboard and seating-assembly-outboard directions (e.g., by rotational motion). Thus, the bolster 34 may be operable between an inboard or vertical position and an outboard or horizontal position, as shown in FIGS. 4C and 4A, respectively. The bolster 34 may further be operable to a position between the inboard position and the outboard position, as depicted in FIG. 4B. In some embodiments, the bolster 34 may be operable to move in the seating-assembly-forward and seating-assembly-rearward directions. Accordingly, as shown in FIGS. 5A-5B, the bolster 34 may be operable between a forward position and a rearward position. It is contemplated that the seating assembly 14 may have a plurality of armrests 30.

The mobility of the armrests 30 and/or components of the armrests 30 may allow for a variety of seating assembly configurations. For example, as shown in FIG. 4A, the armrests 30 may be positioned such that the seating assembly 14 resembles a captain's chair. In some embodiments, the support members 32 of the armrests 30 are in the raised position and the bolsters 34 are in the outboard position while the seating assembly 14 is configured as a captain's chair. As shown in FIG. 6A, the armrests 30 of multiple side-by-side seating assemblies 14 may be configured such that the seating assemblies 14 resemble a couch, loveseat, or bed. For example, in one embodiment, the support members 32 of the armrests 30 are in the lowered position and the bolsters 34 of the armrests 30 are in the outboard position while the seating assemblies are configured as a couch. As shown in FIG. 6B, the armrests 30 of multiple side-by-side seating assemblies 14 may be configured such that the seating assemblies 14 resemble a loveseat. For example, in one embodiment, the support member 32 of an inner armrest 30A of each of the two side-by-side seating assemblies 14 is in the lowered position, the support member 32 of an outer armrest 30B of each of the two side-by-side seating assemblies 14 is in the raised position, and the bolsters 34 of the armrests 30 are in the outboard position while the two seating assemblies 14 are configured as a loveseat. When configured as a loveseat, the side-by-side seating assemblies 14 are adjacent to one another such that a substantially planar and continuous surface of the seat-bases 18 is provided across a width of the side-by-side seating assemblies 14 (e.g., first and second seating assemblies).

In reference to FIGS. 7-7A, a propulsion feature 44 configured to move the armrest 30 may be coupled to the seating assembly 14, the seat-base 18, and/or armrest 30. In some embodiments, the propulsion feature 44 may include an electric motor. In some embodiments, the propulsion feature 44 may include a pyrotechnic mechanism. It is contemplated that the propulsion feature 44 may be at least one of a variety of other devices configured to move the armrest 30.

In further reference to FIGS. 7-7A, a propulsion system 48 configured to engage with the propulsion feature 44 may be coupled to the armrest 30. In some embodiments, the propulsion system 48 may be coupled to and/or engage with the armrest 30, the support member 32, and/or the bolster 34 of the armrest 30. It is contemplated, that in some embodiments, the propulsion system 48 may include at least one of a variety of devices to engage with the propulsion feature 44 (e.g., solenoid, piston assembly, etc.) In some embodiments, the propulsion system 48 may include a recirculating ball race nut 60. The recirculating ball race nut 60 may be coupled to the seating assembly 14, the seat-base 18, and/or the armrest 30. Further, the recirculating ball race nut 60 may be operably coupled to the propulsion feature 44. The recirculating ball race nut 60 may engage with a threaded driver screw 62. The threaded driver screw 62 may have a mechanically reversible thread. The threaded driver screw 62 may be coupled to the armrest 30, the bolster 34, and/or the support member 32.

In operation, the propulsion feature 44 may be configured to rotate the recirculating ball race nut 60; the recirculating ball race nut 60, in turn, drives the threaded driver screw 62, which subsequently moves the armrest 30, the support member 32 and/or the bolster 34. In an example in which the threaded driver screw 62 has a mechanically reversible thread, the armrest 30, the support member 32, and/or the bolster 34 may be moved back and forth depending on the direction of the recirculating ball race nut's 60 rotation. For example, the bolster 34 may be moved from the inboard position to the outboard position as well as from the outboard position to the inboard position. It is contemplated that the propulsion system 48 may include a plurality of propulsion systems 48 that correspond to one or a plurality of propulsion features 44. It is further contemplated that, in some embodiments, the support member 32 and the bolster 34 may engage with and be moved by a singular one of the propulsion system 48, or the support member 32 and the bolster 34 may engage with and be moved by separate propulsion systems 48.

In some embodiments, the propulsion feature 44 may be controlled by an occupant. For example, the occupant may operate a switch that is configured to control the propulsion feature 44. In such an example, the occupant may engage the switch, which subsequently prompts the propulsion feature 44 to power move the armrest 30, the support member 32, and/or the bolster 34. In some embodiments, the armrest 30, the support member 32, and/or the bolster 34 may be manually moved by the occupant. In this way, the armrest 30, the support member 32 and/or the bolster 34 may be moved by the occupant without engaging the propulsion feature 44.

Referring further to FIGS. 7-7A, a locking feature 68 may be coupled to the armrest 30, the support member 32, and/or the bolster 34. The locking feature 68 may be configured to substantially prevent movement of the armrest 30, the support member 32, and/or the bolster 34 relative to the seat-base 18, seatback 22 and/or the support member 32. The locking feature 68 may include at least one of a host of mechanisms configured to prevent movement (e.g., pin, stop, dog, detent, abutment, etc.). In some embodiments, the locking feature 68 may include the propulsion feature 44 (e.g., electric motor). For example, an electric motor that is configured to move the armrest 30, the support member 32, and/or the bolster 34 may also lock the armrest 30, the support member 32, and/or the bolster 34 in place by continuous activation. In some embodiments, the locking feature 68 may be manually engaged and/or disengaged by the occupant. For example, the locking feature 68 may be engaged and/or disengaged by operation of a switch. In some embodiments, the locking feature 68 is engaged by default, and the armrest 30, the support member 32, and/or the bolster 34 may be moved upon disengagement of the locking feature 68. In some embodiments, the locking feature 68 may be engaged and/or disengaged by a controller 70, which will be discussed in greater detail below.

Figure 8:
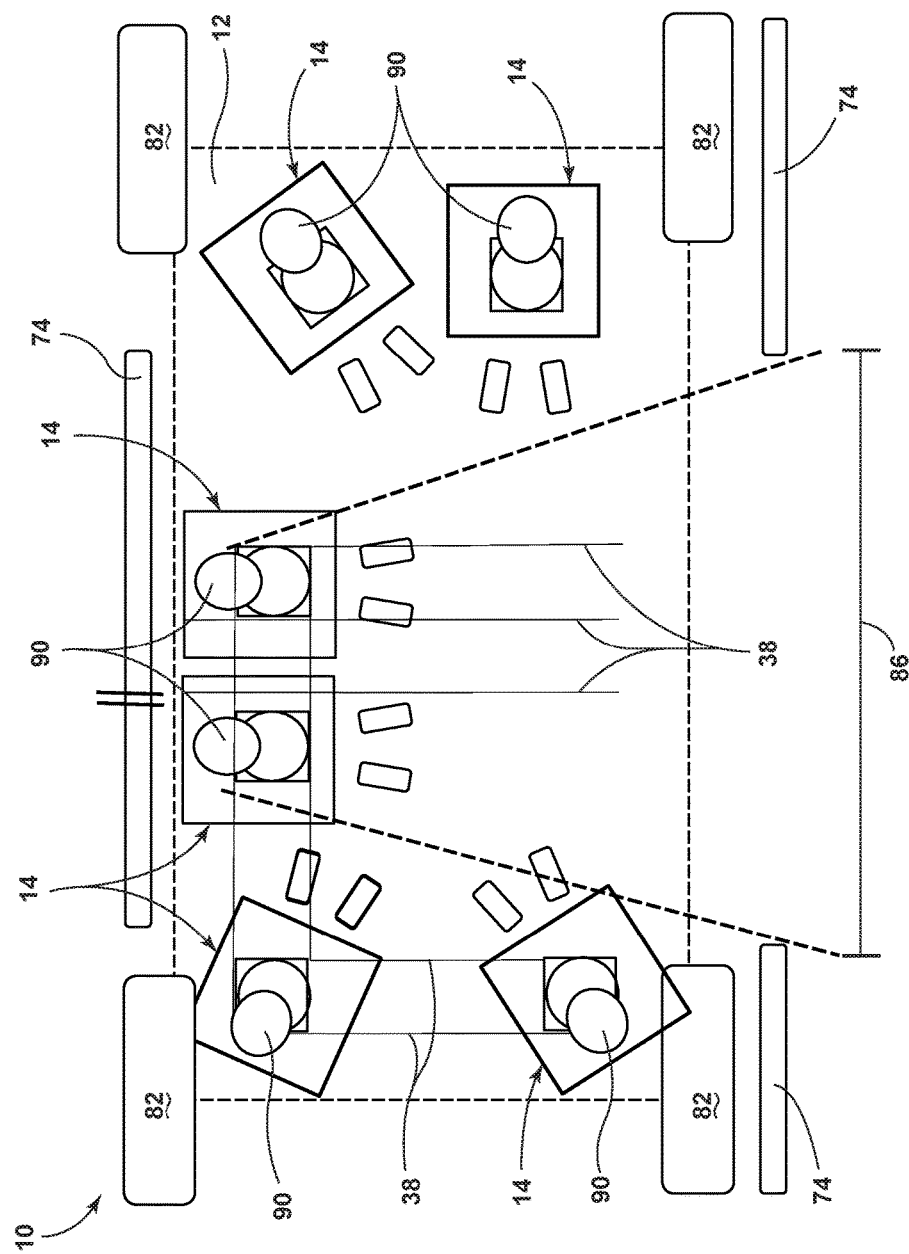
FIG. 8 is a top view of the vehicle interior, illustrating a vehicle seating arrangement, according to one embodiment.

Referring now to FIG. 8, the vehicle 10 may be provided with one or more doors 74. The doors 74 may be positioned on a side 78 of the vehicle 10 and in between two wheels 82 of the vehicle 10. In various examples, the doors 74 may be hinged or sliding doors. When sliding doors are utilized, the individual doors 74 may slide as independent units in the same direction or in opposite directions. For example, on one side 78 of the vehicle 10 shown in FIG. 8 the door or doors 74 may separate toward a front and rear of the vehicle 10 to admit occupants and/or provide a large opening for viewing scenery outside of the vehicle 10. Regardless of how the doors 74 operate, a large window may be provided in at least one of the sides 78 of the vehicle 10 such that a wide viewing angle 86 may be available to occupants 90 while the vehicle 10 is in motion or at rest. For example, the viewing angle 86 may permit the occupants 90 a continuous viewing area that extends along at least about thirty (30) percent of the side 78 of the vehicle 10, at least about forty (40) percent of the side 78 of the vehicle 10, at least about fifty (50) percent of the side 78 of the vehicle 10, at least about sixty (60) percent of the side 78 of the vehicle 10, at least about seventy (70) percent of the side 78 of the vehicle 10, at least about eighty (80) percent of the side 78 of the vehicle 10, at least about ninety (90) percent of the side 78 of the vehicle 10, and/or combinations or ranges thereof. The vehicle interior 12 is equipped with a plurality of seating assemblies 14. The seating assemblies 14 are slidably coupled to the rail system 38. The seating assemblies 14 may be configured to swivel or rotate relative to the rail system 38 such that the seating assemblies 14 may be positioned to enable the occupants 90 to look at one another while conversing, view the scenery outside of the vehicle 10, and/or generally position the seating assemblies 14 with a high degree of freedom to fit their needs or desires.

Figure 9:
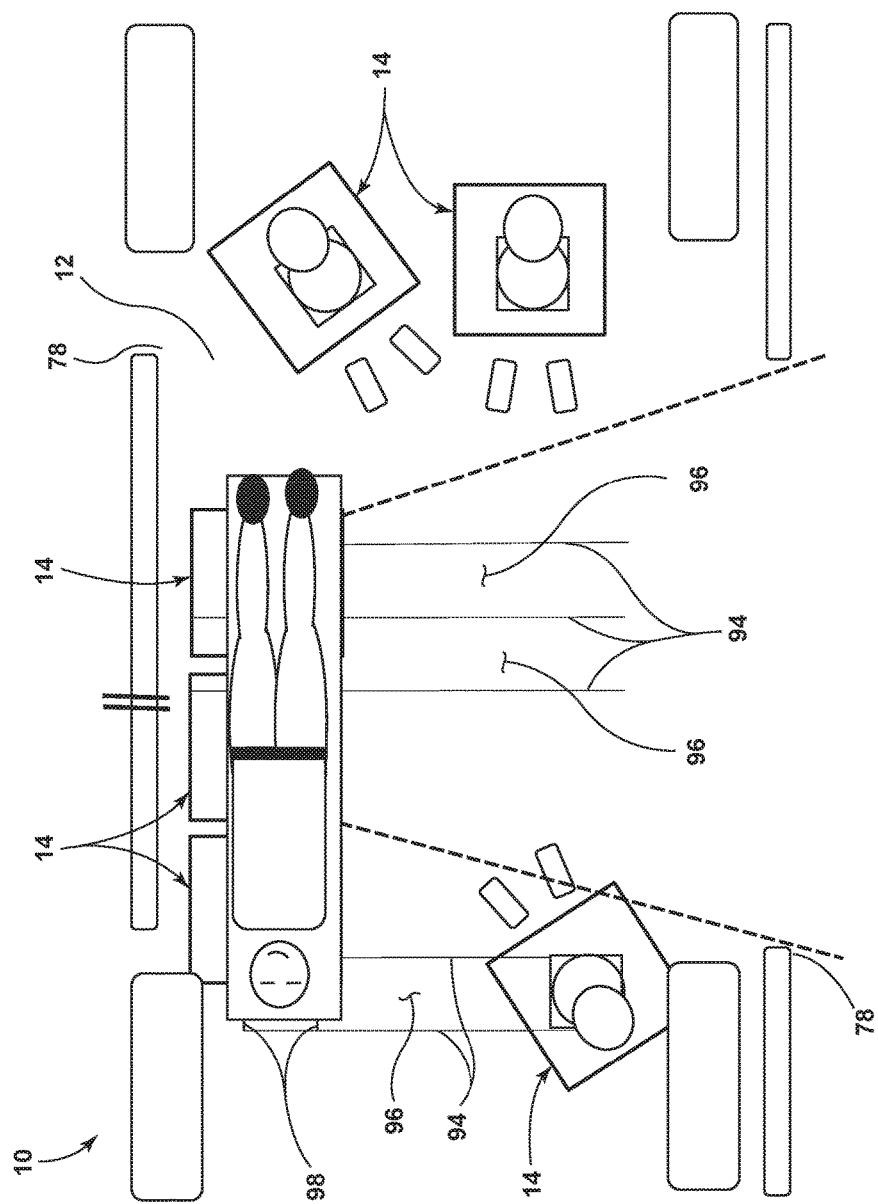
FIG. 9 is a top view of the vehicle interior, illustrating the vehicle seating arrangement, according to another embodiment.
Figure 10:
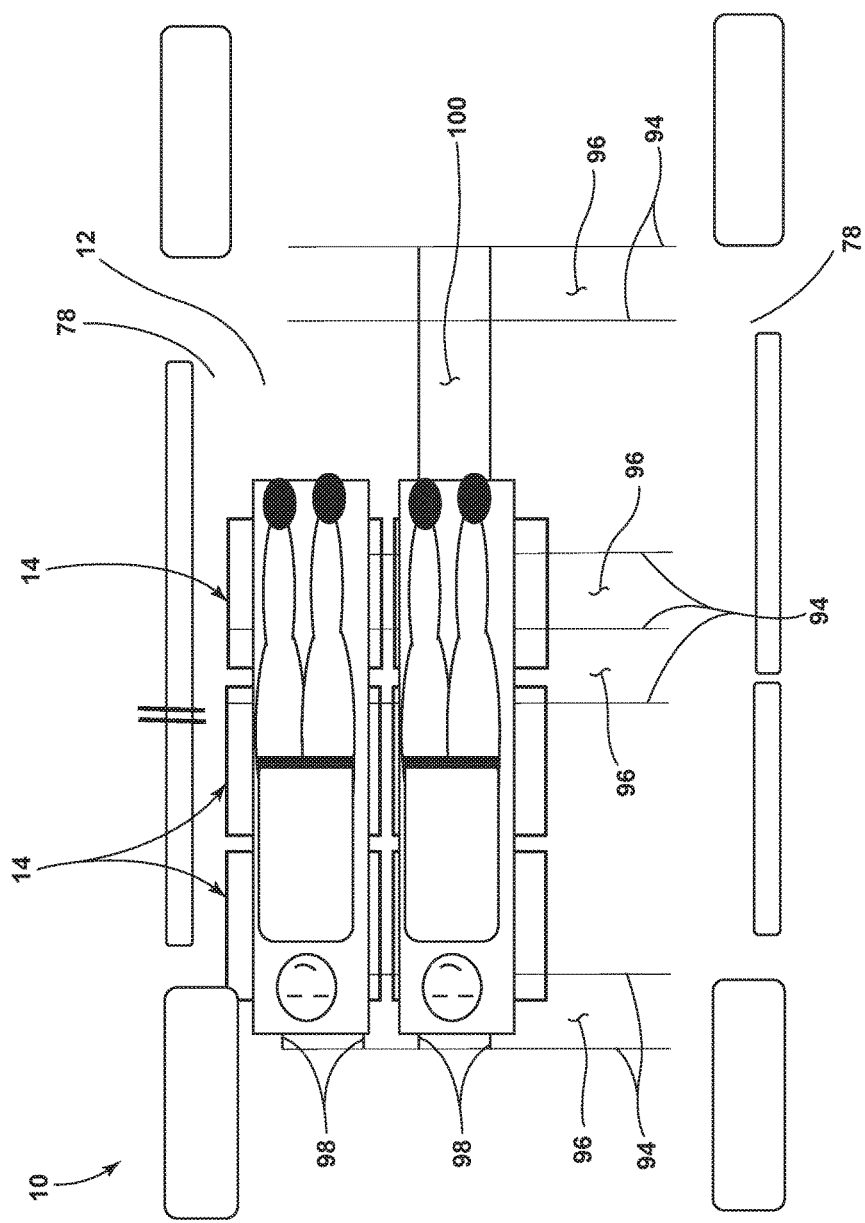
FIG. 10 is a top view of the vehicle interior, illustrating the vehicle seating arrangement, according to a further embodiment.

Referring to FIGS. 9 and 10, three of the seating assemblies 14 have been positioned on the rail system 38 such that the seating assemblies 14 are adjacent to one another along one of the sides 78 of the vehicle 10. The rail system 38 may be provided in various configurations, including, but not limited to, those depicted in FIGS. 8-10. For example, the rail system 38 includes a plurality of lateral rails 94 and a plurality of longitudinal rails 98. In some examples, the plurality of lateral rails 94 includes at least three lateral rails, at least five lateral rails, at least seven lateral rails, and/or combinations or ranges thereof. In some examples, the plurality of longitudinal rails 98 includes at least two longitudinal rails, at least four longitudinal rails, at least six longitudinal rails, and/or combinations or ranges thereof. In general, the plurality of lateral rails 94 provide two or more parallel lateral tracks 96, three or more parallel lateral tracks 96, four or more parallel lateral tracks 96, five or more lateral tracks 96, and/or combinations or ranges thereof. Similarly, the plurality of longitudinal rails 98 provide one or more longitudinal tracks 100, two or more longitudinal tracks 100, three or more longitudinal tracks 100, and/or combinations or ranges thereof. As used herein, the term "track" as it pertains to the rail system 38 is intended to refer to two or more individual rails upon which the seating assemblies 14 may travel about the vehicle interior 12.

Referring again to FIGS. 9 and 10, the longitudinal rails 98 may extend across at least about thirty percent of a length of the vehicle interior 12, at least about forty percent of a length of the vehicle interior 12, at least about fifty percent of a length of the vehicle interior 12, at least about sixty percent of a length of the vehicle interior 12, at least about seventy percent of a length of the vehicle interior 12, at least about eighty percent of a length of the vehicle interior 12, at least about ninety percent of a length of the vehicle interior 12, and/or combinations or ranges thereof. In various examples, the longitudinal rails 98 may be positioned on one of the sides 78 (e.g., a first side) such that the side 78 opposite (e.g., a second side) provides a side entrance that remains unimpeded for ingress, egress, loading, and unloading. Additionally or alternatively, the longitudinal rails 98 may be positioned along a central longitudinal axis of the vehicle 10. The seating assemblies 14 have been placed in the bed configuration by positioning first, second, and third seating assemblies adjacent to one another and articulating the armrests 30 to the lowered position with the bolsters 34 in the outboard position. Accordingly, a substantially planar and continuous surface is provided as a resting surface. The resting surface may have a length of at least about 100 cm, at least about 200 cm, at least about 300 cm, at least about 400 cm, and/or combinations or ranges thereof.

Figure 11:
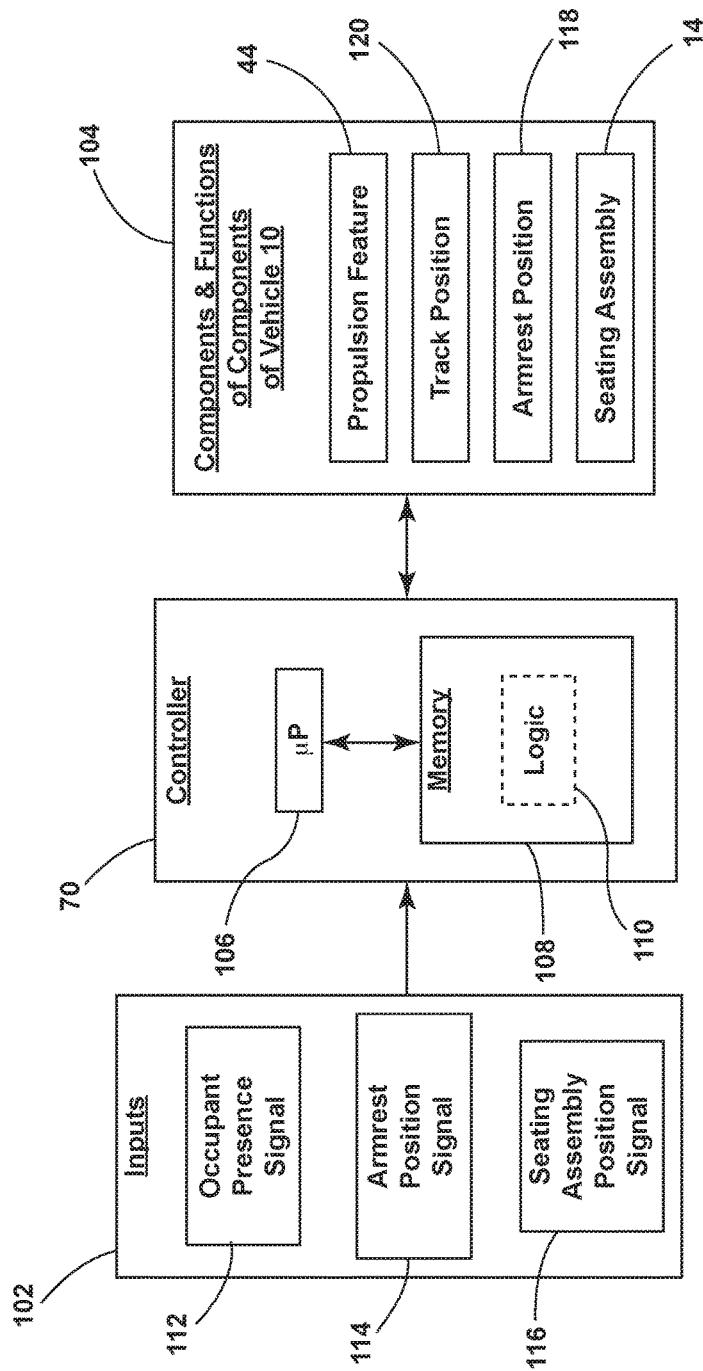
FIG. 11 is a block diagram of the seating assembly and rail system controls, illustrating a controller for controlling the seating assembly and components of the vehicle.

Referring now to FIG. 11, as referenced above, the seating assembly 14 may include the controller 70, which may be configured to receive various inputs 102 and control various outputs 104. The controller 70 may be a shared or dedicated controller that includes a microprocessor 106 and memory 108 as illustrated, according to various embodiments. It should be appreciated that the controller 70 may include control circuitry such as analog and/or digital control circuitry. Stored within the memory 108 and executed by the microprocessor 106 is logic 110 for processing the various inputs 102 and controlling various outputs 104 described herein. The inputs 102 to the controller 70 may include an occupant presence signal 112, an armrest position signal 114, and/or a seating assembly position signal 116, which may be made available from one or more other controller(s) via a vehicle data communication line or a shared bus, and may indicate the presence or absence of an occupant in the seating assembly 14, an armrest position 118 (e.g., vertical and/or rotational position of the armrest 30), and/or a track position 120 of the seating assembly 14 along the rail system 38, respectively.

Referring again to FIG. 11, the presence or absence of an occupant in the seating assembly 14 may be determined through a variety of methods and/or by a variety of features (e.g., weight sensor, proximity sensor, etc.). Determining the presence or absence of an occupant in the seating assembly 14 can inform a decision of the controller 70 as to which seating assemblies 14 may be utilized for a requested reconfiguring of the vehicle interior 12. The position of the armrest 30 may be determined, for example, by referencing a rotational and/or linear actuation sensor that provides information about the linear (vertical and/or horizontal) and/or rotational position of the armrest 30 and/or the components of the armrest 30. The position of the seating assembly 14 along the rail system 38, such as the lateral tracks 96 and the longitudinal tracks 100, may be provided by one or more track position sensors that may be provided in the rail system 38 and/or the seating assembly 14. For example, the track position sensors positioned in the seating assembly 14 may communicate with the track position sensors in the rail system 38 to determine a location of the seating assembly 14 within the vehicle interior 12.

In some embodiments, the inputs 102 to the controller 70 may include various other signals, such as signals from other controllers within the vehicle 10 and/or signals sent to the controller 70 by activation of switches by an occupant. The controller 70 may also be connected, interact with, and/or control various other components of the vehicle 10 (e.g., the seating assembly 14, the armrest 30, the propulsion feature 44, a track position of the seating assembly 14, etc.), and the functions of those components (e.g., movement, speed of movement, activation, engagement, deployment, etc.) directly, and/or through communication with another controller. For example, the controller 70 may facilitate the movement of the seating assembly 14 between various positions within the vehicle interior 12 along the rail system 38 by utilizing the lateral tracks 96 and the longitudinal tracks 100. In some examples, the controller 70 may facilitate such action by receiving the input 102 (e.g., seating assembly position signal 116) and executing the logic 110 stored within the memory 108 with the microprocessor 106.

Figure 12:
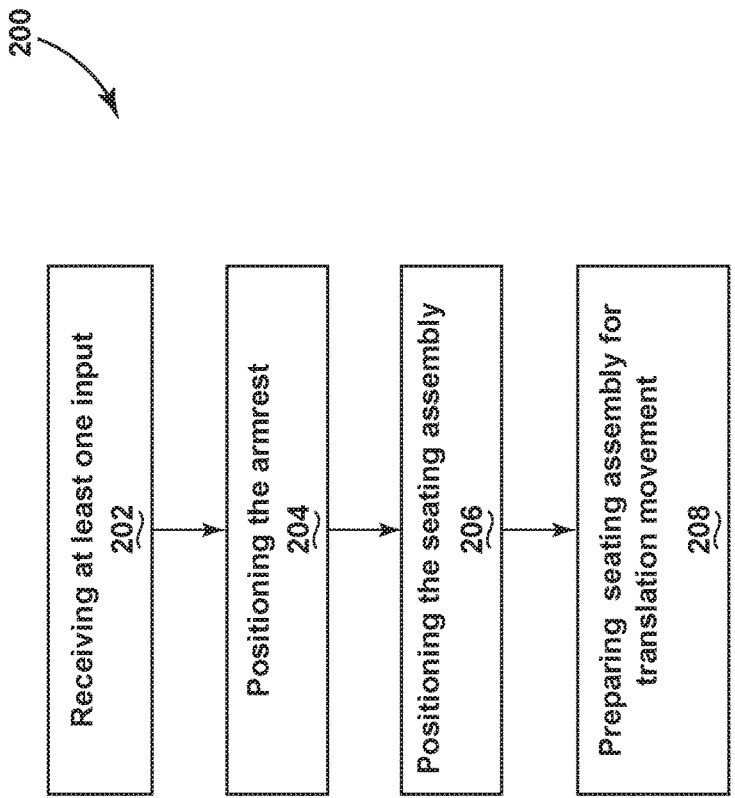
FIG. 12 is a flow chart of a method of operating the seating assembly, according to one embodiment.

In reference to FIG. 12, a method 200 of operating the seating assembly 14 is disclosed. The method 200 may include the step 202 of receiving at least one input 102. As discussed above, the controller 70 may receive inputs 102 from various sources. In various embodiments, the inputs 102 may include the occupant presence signal 112, the armrest position signal 114, the seating assembly position signal 116, and/or various other signals. Next, the method 200 may include the step 204 of positioning the armrest 30. As discussed above, positioning the armrest 30 may include linear and/or rotational actuation of the armrest 30 and/or components of the armrest 30 (e.g., inner armrest 30A, outer armrest 30B, support member 32, bolster 34, etc.). For example, one or more of the armrests 30 on one or more seating assemblies 14 (e.g., first, second, and/or third seating assemblies) may be articulated to a lowered position. Additionally or alternatively, the bolster 34 on one or more of the armrests 30 of one or more seating assemblies 14 (e.g., first, second, and/or third seating assemblies) may be articulated to a horizontal position (e.g., the outboard position) such that a surface area of the seat-base 18 of the respective seating assembly 14 is increased. Next, the method 200 may include the step 206 of positioning the seating assembly 14 within the vehicle interior 12. For example, a first seating assembly and a second seating assembly may be positioned such that the bolsters 34 of the first and second seating assemblies are in close proximity to one another, thereby providing a loveseat configuration. When providing the loveseat configuration of the first and second seating assemblies, the seat-bases 18 of the first and second seating assemblies are substantially planar and continuous with one another. The step 206 of positioning the seating assembly 14 may further include positioning the bolsters 34 of the first, second, and third seating assemblies in close proximity to the bolsters 34 of at least one of the other first, second, and third seating assemblies. When providing the bolsters 34 of the first, second, and third seating assemblies in close proximity to one another (e.g., by placing the first, second, and third seating assemblies adjacent to one another), a bed configuration may be provided. When the bed configuration is provided, the seat-bases 18 of the first, second, and third seating assemblies are substantially planar and continuous with one another. For example, the seat-bases 18 of the first, second, and third seating assemblies may be substantially planar and continuous across a width of the first, second, and third seating assemblies. The method 200 may further include the step 208 of preparing the seating assembly for translational movement. For example, the step 208 of preparing the seating assembly for translational movement may include articulating the bolster 34 on one or more of the armrests 30 of at least one of the first, second, and third seating assemblies to a vertical position when preparing the seating assembly 14 for relocation within the vehicle interior 12.

It is to be understood that unless specifically stated otherwise in the claims, that the steps of the method of operating a seating assembly 200 need not be performed in the order that each step is listed above.

Use of the present disclosure may provide a variety of advantages. As the user experience for vehicles continues to evolve, consumers desire increasing amounts of comfort and functionality from the vehicles they purchase or utilize. Accordingly, the present disclosure provides a vehicle seating arrangement that has a high degree of freedom in terms of positioning configuring of the seating assemblies 14 for a variety of uses. Therefore, the consumer may purchase or utilize a single vehicle when previously more than one vehicle may have been required to provide an equivalent level of functionality and/or comfort. For example, the vehicle seating arrangements disclosed herein may enable a single vehicle to be utilized as a commuter vehicle, recreation vehicle, family vehicle, and so on.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating arrangement, comprising:
   a rail system having a plurality of lateral and longitudinal rails; and
   at least one seating assembly coupled to the rail system, wherein the seating assembly comprises one or more armrests coupled to a seat-base, wherein the armrests are configured for articulation in a vertical direction relative to the seat-base, wherein the armrests enable the seating assembly to transition between captains' chair, loveseat, and bed configurations.

2. The vehicle seating arrangement of claim 1, wherein the at least one seating assembly comprises a first seating assembly and a second seating assembly.

3. The vehicle seating arrangement of claim 2, wherein the plurality of lateral rails comprises at least five lateral rails.

4. The seating assembly of claim 3, wherein the at least five lateral rails provide three or more parallel lateral tracks.

5. The vehicle seating arrangement of claim 3, wherein the plurality of longitudinal rails comprises at least two longitudinal rails that extend across at least about fifty percent of a length of an interior of a vehicle to which the longitudinal rails are coupled.

6. The vehicle seating arrangement of claim 5, wherein the at least two longitudinal rails are positioned on a first side of the vehicle such that a side entrance on a second side of the vehicle remains unimpeded.

7. The vehicle seating arrangement of claim 5, wherein the at least two longitudinal rails are positioned along a central longitudinal axis of the vehicle.

8. The vehicle seating arrangement of claim 5, wherein the plurality of longitudinal rails extend across at least about eighty percent of the length of the interior of the vehicle.

9. A vehicle seating arrangement, comprising:
   a rail system having a plurality of lateral and longitudinal rails positioned in a vehicle floor;
   at least one seating assembly coupled to the rail system, wherein the seating assemblies comprise armrests coupled to a seat-base, wherein the armrests are configured for articulation in a vertical direction relative to the seat-base, wherein the armrests enable the seating assembly to transition between captains' chair, loveseat, and bed configurations.

10. The vehicle seating arrangement of claim 9, wherein the at least one seating assembly comprises a first seating assembly and a second seating assembly.

11. The vehicle seating arrangement of claim 10, wherein the plurality of lateral rails comprises at least five lateral rails.

12. The vehicle seating arrangement of claim 11, wherein the at least five lateral rails provide three or more parallel lateral tracks.

13. The vehicle seating arrangement of claim 11, wherein the plurality of longitudinal rails comprises at least two longitudinal rails that extend across at least about fifty percent of a length of an interior of a vehicle to which the longitudinal rails are coupled.

14. The vehicle seating arrangement of claim 13, wherein the at least two longitudinal rails are positioned on a first side of the vehicle such that a side entrance on a second side of the vehicle remains unimpeded.

15. The vehicle seating arrangement of claim 13, wherein the at least two longitudinal rails are positioned along a central longitudinal axis of the vehicle.

16. The vehicle seating arrangement of claim 13, wherein the plurality of longitudinal rails extend across at least about eighty percent of the length of the interior of the vehicle.

17. A vehicle seating arrangement, comprising:
- a rail system having at least five lateral and at least two longitudinal rails positioned in a vehicle floor;
- at least one seating assembly coupled to the rail system, wherein the seating assemblies comprise armrests coupled to a seat-base, wherein the armrests are configured for articulation in a vertical direction relative to the seat-base, wherein the armrest enables the seating assembly to transition between captains' chair, loveseat, and bed configurations.

18. The vehicle seating arrangement of claim 17, wherein the at least one seating assembly comprises:
- a first seating assembly; and
- a second seating assembly, wherein the loveseat configuration is accomplished by articulation of the armrests of the first and second seating assemblies to a lowered position, and wherein the first and second seating assemblies are adjacent to one another and positioned such that the seat-bases of the first and second seating assemblies provide a substantially planar and continuous surface across a width of the first and second seating assemblies.

19. The vehicle seating arrangement of claim 17, wherein the at least one seating assembly comprises:
- a first seating assembly;
- a second seating assembly; and
- a third seating assembly, wherein a bed configuration is accomplished by articulation of the armrests of the first, second, and third seating assemblies to a lowered position, wherein the first, second, and third seating assemblies are adjacent to one another such that a substantially planar and continuous surface of the seat-base is provided across a width of the first, second, and third seating assemblies.

20. The vehicle seating arrangement of claim 19, wherein the first, second, and third seating assemblies in the bed configuration provide the substantially planar and continuous surface as a resting surface having a length of at least about 200 cm.

* * * * *